(12) United States Patent
Jeon et al.

(10) Patent No.: US 9,769,464 B2
(45) Date of Patent: Sep. 19, 2017

(54) IMAGE DISPLAY DEVICE

(71) Applicant: SAMSUNG ELECTRONICS CO., LTD., Suwon-si (KR)

(72) Inventors: Keun Bae Jeon, Suwon-si (KR); Masaru Minami, Hwaseong-si (KR); Hyeong Sik Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 107 days.

(21) Appl. No.: 14/506,807

(22) Filed: Oct. 6, 2014

(65) Prior Publication Data
US 2015/0181201 A1 Jun. 25, 2015

(30) Foreign Application Priority Data
Dec. 19, 2013 (KR) .......................... 10-2013-0159539

(51) Int. Cl.
*G02B 27/26* (2006.01)
*H04N 13/04* (2006.01)
*G02B 5/30* (2006.01)
*G02B 27/22* (2006.01)
*G02B 27/28* (2006.01)
*G02F 1/1335* (2006.01)

(52) U.S. Cl.
CPC ....... *H04N 13/0402* (2013.01); *G02B 5/3025* (2013.01); *G02B 27/2214* (2013.01); *G02B 27/26* (2013.01); *G02B 27/285* (2013.01); *H04N 13/0418* (2013.01); *H04N 13/0434* (2013.01); *G02F 2001/133538* (2013.01)

(58) Field of Classification Search
CPC . G02B 27/2214; G02B 27/26; H04N 13/0404
USPC ................ 359/462, 465; 348/57, 58; 349/15
See application file for complete search history.

(56) References Cited

U.S. PATENT DOCUMENTS

| | | | | |
|---|---|---|---|---|
| 5,844,717 A * | 12/1998 | Faris | ................ | G02B 27/0093 |
| | | | | 348/E5.141 |
| 5,875,055 A * | 2/1999 | Morishima | ........ | G02B 27/2214 |
| | | | | 348/57 |
| 6,046,849 A * | 4/2000 | Moseley | .............. | G02B 5/3016 |
| | | | | 348/57 |
| 7,404,642 B2 * | 7/2008 | Shestak | ............. | G02B 27/2214 |
| | | | | 348/57 |

FOREIGN PATENT DOCUMENTS

| | | |
|---|---|---|
| EP | 0829744 A2 | 3/1998 |
| GB | 2331812 A | 6/1999 |
| KR | 10-2012-0031531 A | 4/2012 |
| WO | 2012/003215 A1 | 1/2012 |

OTHER PUBLICATIONS

Communication dated Apr. 30, 2015 issued by European Patent Office in counterpart European Application No. 14188937.8.

* cited by examiner

*Primary Examiner* — Audrey Y Chang
(74) *Attorney, Agent, or Firm* — Sughrue Mion, PLLC

(57) ABSTRACT

An image display device is provided. The image display device includes a light source and a polarizer including a first polarizing region configured to linearly polarize light which is output from the light source and a second polarizing region configured to circularly polarize light which is output from the light source.

12 Claims, 13 Drawing Sheets

10

400

300

200

100

IMAGE DISPLAY DEVICE

CROSS-REFERENCE TO RELATED APPLICATION

This application claims priority from Korean Patent Application No. 10-2013-0159539, filed on Dec. 19, 2013 in the Korean Intellectual Property Office, the disclosure of which is incorporated herein by reference in its entirety.

BACKGROUND

1. Field

Devices consistent with the exemplary embodiments relate to an image display device, and more specifically, to a glass-free image display device having an improved structure for implementing a two-dimensional (2D) and three-dimensional (3D) image.

2. Description of the Related Art

Stereoscopic image display devices implement a 3D image using a stereoscopic technique or an auto-stereoscopic technique. The stereoscopic technique uses a parallax image between a user's left and right eye which has a great stereoscopic effect. The stereoscopic technique may be classified as a glass type or a glass-free type technique.

In the glass type technique, an image is displayed on a direct-view display device or a projector by changing a polarization direction of the parallax image between the left and right eye or by using a time division method. A stereoscopic image is implemented using polarized eyeglasses or liquid crystal shutter eyeglasses. In the glass-free method, a stereoscopic image is implemented by installing optical components, such as a lenticular lens, and a parallax barrier in front of and behind a display screen in order to separate an optical axis of the parallax image between the left and right eye.

As an example of the glass-free methods, in a method of using the lenticular lens, a 3D stereoscopic image is implemented by separating a right-eye image and a left-eye image using the lenticular lens. In the method using the lenticular lens, since it is impossible to turn optical separation of the lenticular lens on and off, only the 3D stereoscopic image is implemented and conversion between the 3D stereoscopic image and a 2D plane image is not possible.

In order to address problems related to the use of the lenticular lens, a crystal lenticular lens capable of converting a 2D and 3D image, in which a lenticular lens is implemented by electrically controlling a refractive index of a liquid crystal, has been proposed. However, such a liquid crystal lenticular lens has a problem in that an arrangement direction of liquid crystal molecules needs to be adjusted in accordance with a 2D image and a 3D image, the lens is expensive, and a large scale lens is difficult to manufacture.

As another example of the glass-free methods, a parallax barrier method is more advantageous than the lenticular lens method in terms of a cross-talk and a view angle, but luminance may decrease, and two sheets of cells need to be used since an image cell and a barrier cell are composed of a double structure.

SUMMARY

In view of the aforementioned problems, exemplary embodiments provide a glass-free 2D and 3D image display device including a mask-type polarizer without an anisotropic lens, such as a lenticular lens.

The exemplary embodiment also provides a glass-free 2D and 3D image display device including a polarizer in which reflectivity of a surface is improved such that luminance of an image display device is improved.

According to an aspect of an exemplary embodiment, there is provided an image display device. The device includes a light source and a polarizer including a first polarizing region configured to linearly polarize light output from the light source and a second polarizing region configured to circularly polarize light output from the light source.

In the polarizer, the first polarizing region and the second polarizing region may be formed so as to alternate.

The first polarizing region and the second polarizing region of the polarizer may have a same transmittance.

The first polarizing region may be larger region than the second polarizing region.

In the polarizer, reflectivity of a first surface facing the light source may be higher than a reflectivity of a second surface of the polarizer which does not face the light source.

The device may further include a polarizing switch (PS) panel configured to use polarized light output from the polarizer as incident light, and configured to perform one of polarizing the incident light into light in a direction perpendicular to the PS panel or allow the incident light to pass through the PS panel without changing the incident light.

The device may further include a PS panel located between the light source and the polarizer, and configured to use light output from the light source as incident light and polarize the incident light into light in a direction perpendicular to the PS panel or allow the incident light to pass through the PS panel without changing the incident light.

The PS panel may be a liquid crystal panel configured to polarize the incident light into the light in the direction perpendicular to the PS panel or allow the incident light to pass through the PS panel without changing the incident light according to dielectric anisotropy of a liquid crystal operating in a twisted nematic (TN) mode.

The PS panel may polarize the incident light into the light in the direction perpendicular to the PS panel when power is applied to the PS panel and the PS panel may allow the incident light to pass through the PS panel without changing the incident light when power of the PS panel is blocked, or the PS panel may allow the incident light to pass through without changing the incident light when power is applied to the PS panel and the PS panel may polarize the incident light into the light in the direction perpendicular to the PS panel when power of the PS panel is blocked.

The device may further include a display panel configured to output an image.

The display panel may be a liquid crystal panel operating in a twisted nematic (TN) mode.

The display panel may include a liquid crystal layer, a first polarizing film located on an observer side of the liquid crystal layer, and a second polarizing film located on a side opposite to the observer side of the liquid crystal layer.

The display panel may be located after the polarizer with respect to an output direction of light from the light source.

The polarizer may be located between the liquid crystal layer and the second polarizing film.

BRIEF DESCRIPTION OF THE DRAWINGS

These and/or other aspects of the exemplary embodiments will become apparent and more readily appreciated from the following description of the exemplary embodiments, taken in conjunction with the accompanying drawings of which.

DETAILED DESCRIPTION

Figure 1:
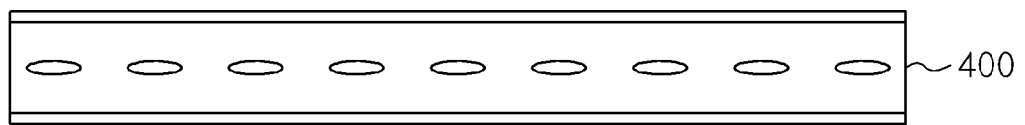
FIG. 1 is a diagram illustrating a schematic configuration of a glass-free image display device according to an exemplary embodiment.
Figure 1:
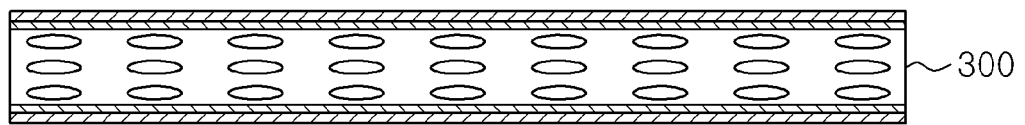
Figure 1:
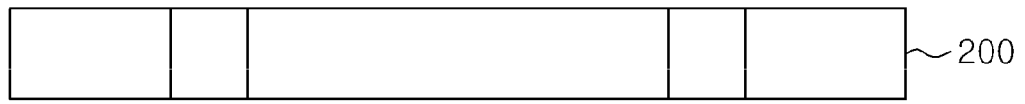
Figure 1:

Exemplary embodiments disclosed in this specification and configurations illustrated in the drawings are only exemplary examples, and there may be various modifications that can replace the exemplary embodiments and the drawings of this specification.

Hereinafter, exemplary embodiments will be described in detail with reference to the accompanying drawings.

FIG. 1 is a diagram illustrating a schematic configuration of a glass-free image display device 10 according to an exemplary embodiment.

As illustrated in FIG. 1, the glass-free image display device 10 according to the exemplary embodiment includes a light source 100 configured to output light, a polarizer 200 disposed above the light source 100, a polarizing switch (PS) panel 300 disposed above the polarizer 200, and a display panel 400 disposed above the PS panel 300. Here, the polarizer 200, the PS panel 300, and the display panel 400 may be sequentially stacked on a light propagating path as illustrated in FIG. 1. However, in the exemplary embodiments, the positions of the panels may be changed as can be easily conceived by those skilled in the art.

Hereinafter, each configuration of the image display device 10, according to the exemplary embodiments, will be described in detail by exemplifying a case in which the polarizer 200, the PS panel 300, and the display panel 400 are sequentially stacked on the light propagating path as illustrated in FIG. 1.

Figure 2:
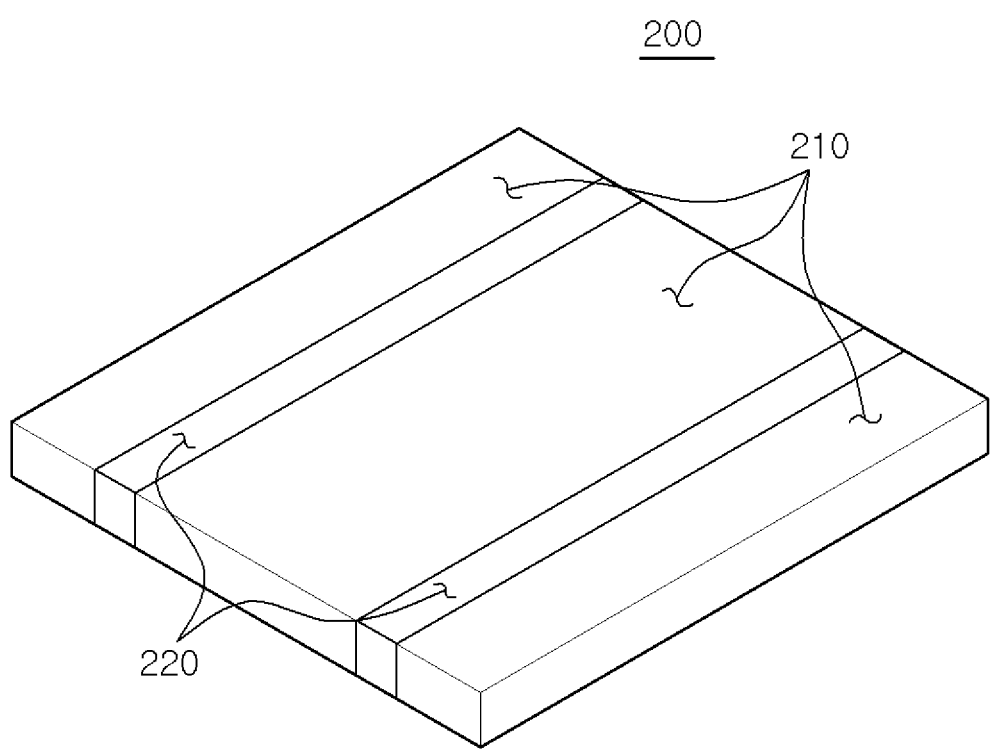
FIG. 2 is a diagram illustrating a structure of the mask-type polarizer in FIG. 1, in accordance with an exemplary embodiment.

The polarizer 200 is a mask-type polarizer 200. FIG. 2 is a diagram illustrating a structure of the mask-type polarizer 200 in FIG. 1 in accordance with an exemplary embodiment.

As illustrated in FIG. 2, the mask-type polarizer 200, according to the exemplary embodiment, includes a first polarizing region 210 configured to linearly polarize light which is output from the light source 100 and a second polarizing region 220 configured to circularly polarize light which is output from the light source 100.

The first polarizing region 210 and the second polarizing region 220 according to the exemplary embodiment may be provided as having a strip structure. The first polarizing region 210 and the second polarizing region 220 may be formed so as to alternate. Here, the strip structure refers to a polarizing region having an elongated shape. However, the first polarizing region 210 and the second polarizing region 220 may have various structures, and is not limited to the strip structure, as can be easily conceived by those skilled in the art.

The first polarizing region 210 linearly polarizes light which is output from the light source 100 in a specific direction so that light from the other directions is blocked. That is, a part in which the first polarizing region 210 of the polarizer 200 is formed serves as a barrier and blocks some light output from the light source 100. Therefore, a 3D image can be implemented in the same format as in a barrier method.

The second polarizing region 220 allows light output from the light source 100 to be unconditionally passed through. That is, a blank may be formed in a part other than the first polarizing region 210 of the polarizer 200 and is defined as the second polarizing region 220.

Here, the first polarizing region 210 may be formed larger than the second polarizing region 220 in order to effectively implement a 3D image, and the second polarizing region 220 may be disposed on the polarizer 200 at predetermined intervals. Also, the first polarizing region 210 and the second polarizing region 220 of the mask-type polarizer 200 may be prepared so as to have the same transmittance in order to adjust the intensity of light to be output, such that the first polarizing region 210 and the second polarizing region 220 have the same luminance in a 2D mode.

Meanwhile, in the barrier method, since some light which is output from the light source 100 is blocked by the barrier above the light source 100, the luminance of a final output image may decrease. Since the image display device 10 according to the exemplary embodiment also uses the same format as in the barrier method in order to implement a 3D image, the same problem may occur.

Therefore, it is possible to improve the luminance by recycling light that was output from the light source 100 and blocked in the first polarizing region 210. More specifically, it is possible to increase luminance such that light which is blocked in the first polarizing region 210 is incident again on the first polarizing region 210 by increasing the reflectivity of the first polarizing region 210 of the polarizer 200 which faces the light source 100.

Figure 3A:
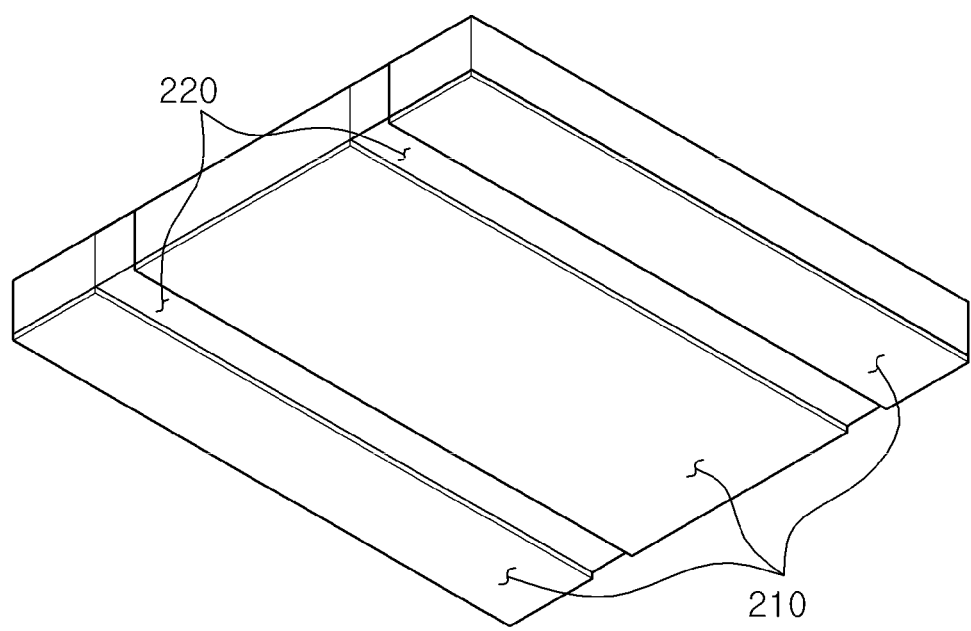
FIG. 3A is a diagram illustrating a structure of a mirror-type polarizer in which reflectivity of a surface increases, in accordance with an exemplary embodiment.
Figure 3B:
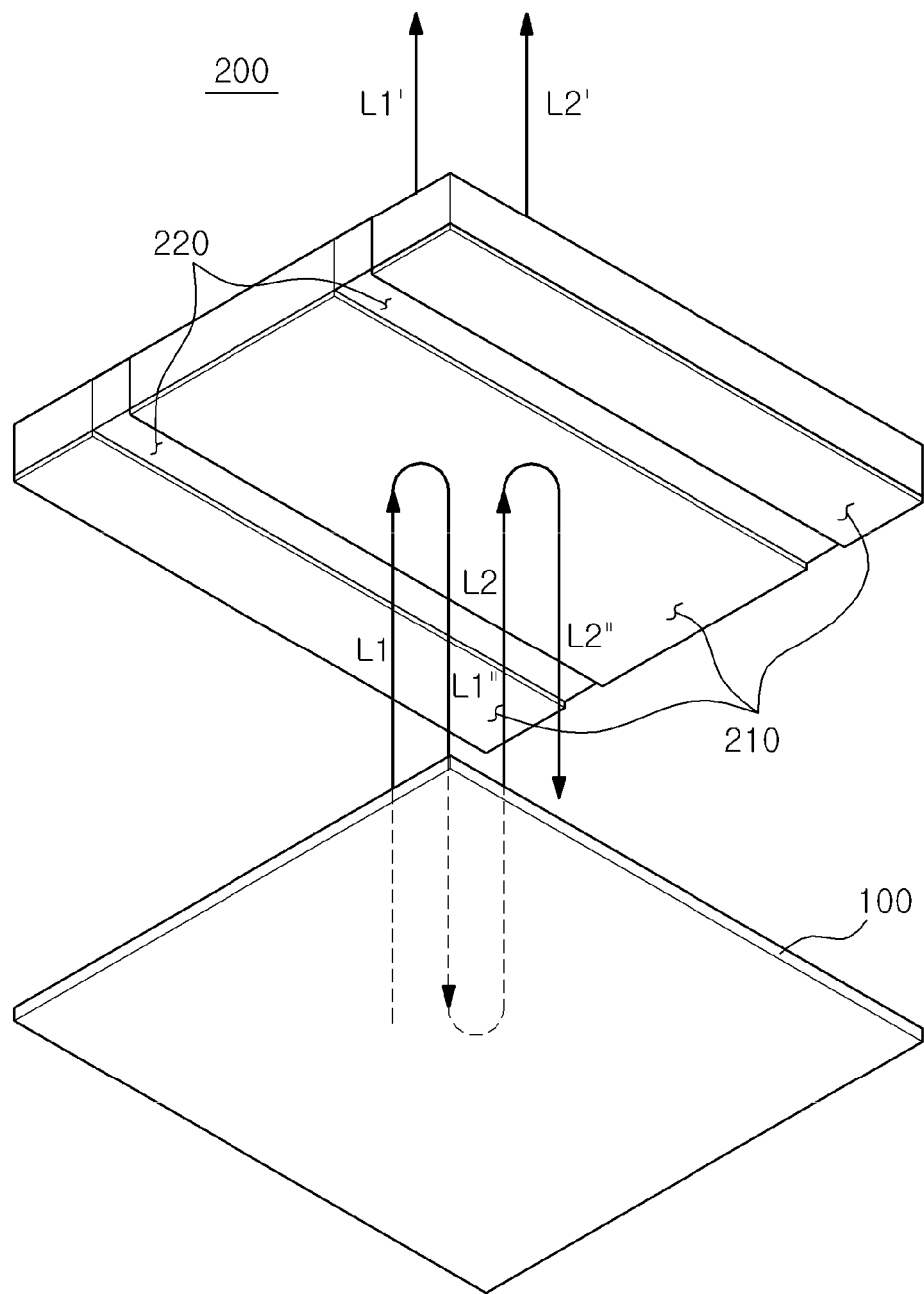
FIG. 3B is a diagram illustrating a process of recycling light through the polarizer illustrated in FIG. 3A, in accordance with an exemplary embodiment.

FIG. 3A is a diagram illustrating a structure of a mirror-type polarizer 200 of which reflectivity of a surface is improved, in accordance with an exemplary embodiment, and FIG. 3B is a diagram illustrating a process of recycling light by applying the polarizer 200 in FIG. 3A, in accordance with an exemplary embodiment.

As illustrated in FIG. 3A, the mirror-type polarizer 200 according to the exemplary embodiment may have a structure in which a surface of the first polarizing region 210 of the polarizer 200 which faces the light source 100 is coated with coating particles which have high reflectivity.

As illustrated in FIG. 3A, when reflectivity of the first polarizing region 210 of the polarizer 200 facing the light source 100 is improved, light that was output from the light source 100 and then was blocked in the first polarizing region 210 is recycled and is incident again on the first polarizing region 210 or the second polarizing region 220. As a result, the luminance of the image display device 10 may be improved.

More specifically, a process of recycling light will be described with reference to FIG. 3B. When light L1 is output from the light source 100, some light L1' of the light L1 passes through the first polarizing region 210, which is provided in a mirror type region, and the remaining light L1" is recycled. The L1" is reflected again at a boundary surface of the light source 100 and is incident again on the polarizer 200 in the form of light L2. FIG. 3B illustrates a case in which light is incident again on the first polarizing region 210 of the polarizer 200, and some light L2' of the light L2 passes through the polarizer 200 and the remaining light L2" is recycled. Meanwhile, although not illustrated in FIG. 3B, when the light L2 is incident on the second polarizing region 220, the light is circularly polarized and passes through the polarizer 200.

The PS panel 300 is disposed above the polarizer 200, and uses light, which is linearly polarized or circularly polarized in the polarizer 200, and is output, as incident light. The PS panel 300 polarizes the incident light into light in a direction perpendicular to the PS panel 300 or allows the incident light to pass through without change. The PS panel 300 also provides the light in a direction of the display panel 400 disposed above the PS panel 300.

In addition, as the PS panel 300 according to the exemplary embodiment, a liquid crystal panel having a liquid crystal layer 350 operating in a twisted nematic (TN) mode may be used, and a liquid crystal panel operating in a vertical alignment (VA) mode, in a plane switching (IPS) mode, and in a fringe field switching (FFS) mode may also be used.

Figure 4:
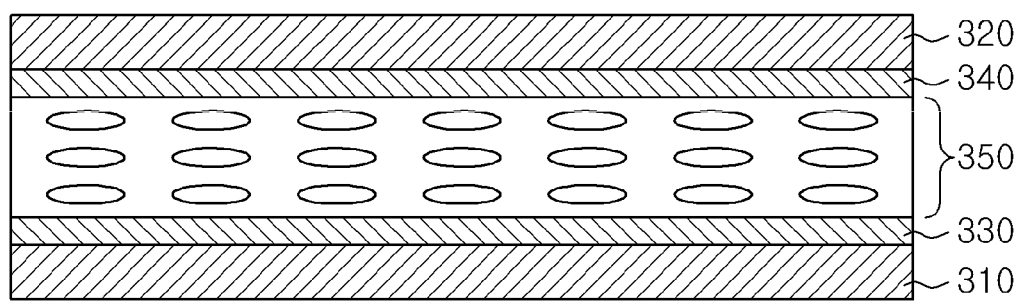
FIG. 4 is a diagram illustrating a structure of a polarizing switch (PS) panel made of a liquid crystal panel operating in a twisted nematic (TN) mode, in accordance with an exemplary embodiment.

Hereinafter, a configuration of the PS panel 300 will be described in detail with reference to the accompanying drawings. FIG. 4 is a diagram illustrating a structure of the PS panel 300, which is made of the liquid crystal panel, operating in the TN mode, in accordance with an exemplary embodiment.

As illustrated in FIG. 4, the PS panel 300 has a structure in which the liquid crystal layer 350 is interposed between a lower substrate 310 and an upper substrate 320. The lower substrate 310 and the upper substrate 320 may be made of a glass or a transparent plastic. A lower electrode 330 and an upper electrode 340 are formed on the entire surfaces of the lower substrate 310 and the upper substrate 320, respectively. The lower electrode 330 and the upper electrode 340 are made of a transparent conductive material, such as indium tin oxide (ITO) and indium-doped zinc oxide (IZO). In addition, the liquid crystal layer 350 is disposed between the lower electrode 330 and the upper electrode 340.

Liquid crystal molecules constituting the liquid crystal layer 350 are made of positive liquid crystals. A positive liquid crystal is a liquid crystal in which a long-axis direction dielectric constant of a liquid crystal molecule is greater than a short-axis direction dielectric constant. These liquid crystals are disposed between upper and lower alignment layers (not illustrated) and are pre-tilted.

Figure 5:
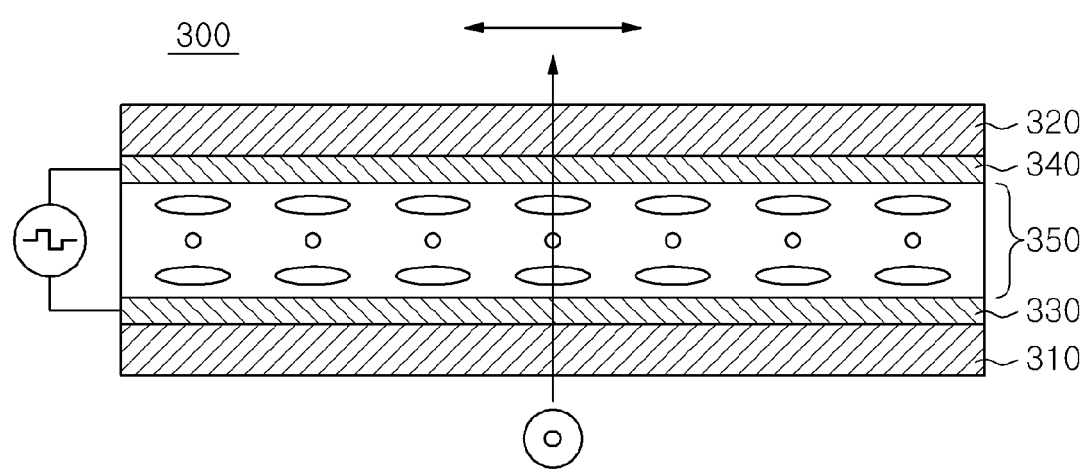
FIGS. 5 and 6 are diagrams illustrating a process of operating the PS panel which is made of the liquid crystal panel and operating in the TN mode, in accordance with an exemplary embodiment.
Figure 6:
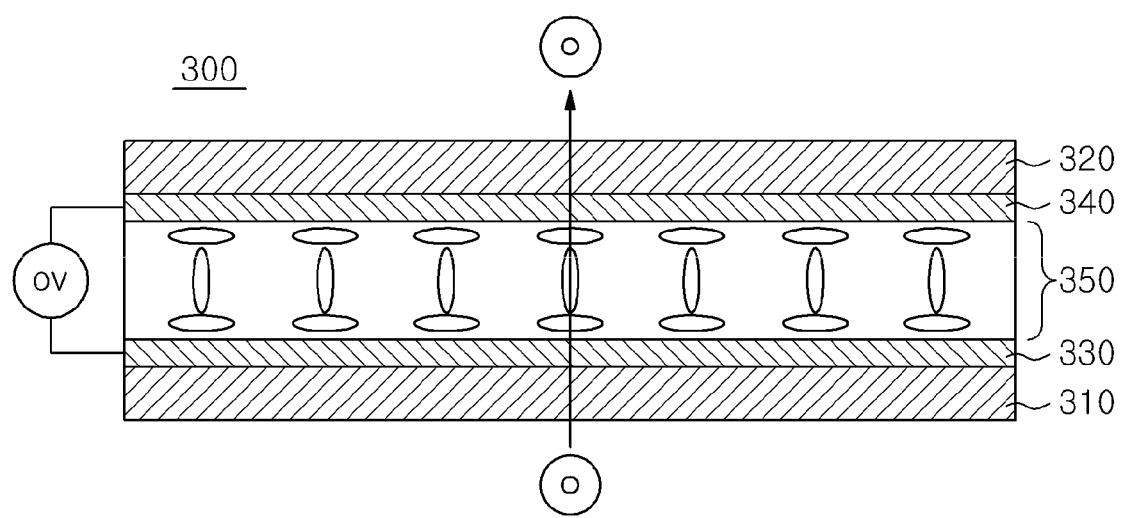

FIGS. 5 and 6 are diagrams illustrating a process of operating the PS panel 300 which is made of the liquid crystal panel and operating in the TN mode, in accordance with an exemplary embodiment.

When no electric field is applied to the PS panel 300, the liquid crystals are arranged so as to pass through light without change. When an electric field is applied to the PS panel 300, the liquid crystals are arranged so that linearly polarized light along a vertical-direction (☉) of light is rotated by 90° and is converted into linearly polarized light along a horizontal-direction (↔). Therefore, as illustrated in FIG. 5, while the electric field is applied, the PS panel 300 linearly polarizes light having a polarization axis along the vertical-direction (☉) into light having a polarization axis along the horizontal-direction (↔), and allows the light to pass through. As illustrated in FIG. 6, when no electric field is applied, the PS panel 300 allows the light having a polarization axis along the vertical-direction (☉) to pass through without change, and thereby a polarization axis of the passing light also lies in the vertical-direction (☉).

The display panel 400 is a display device for displaying 2D and 3D image data, and may be implemented by a liquid crystal display (LCD), a field emission display (FED), a plasma display panel (PDP), an electroluminescence (EL) device, including an inorganic electroluminescence device and an organic light emitting diode (OLED), and a flat panel display, such as an electrophoresis (EPD).

Figure 7:
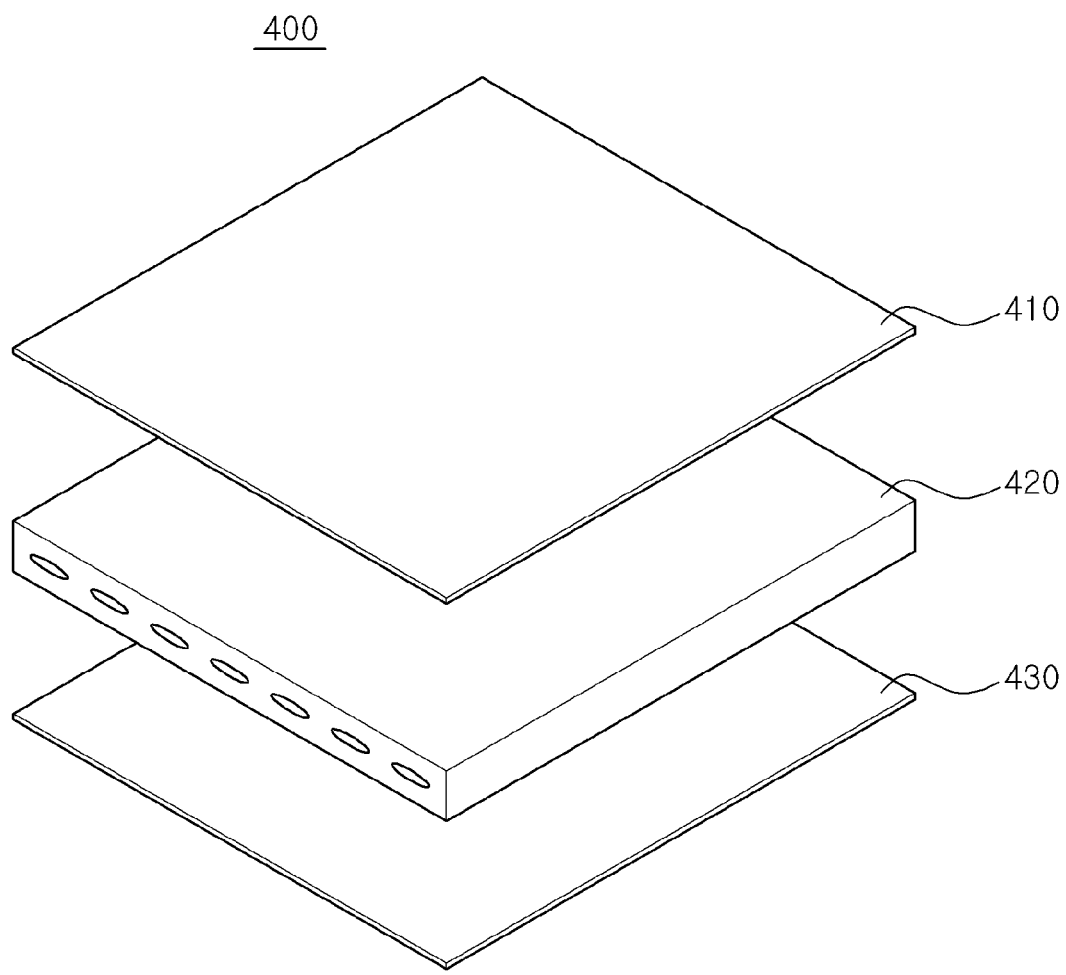
FIG. 7 is a diagram illustrating a structure of a display panel in FIG. 1, in accordance with an exemplary embodiment.

FIG. 7 is a diagram illustrating a structure of the display panel 400, in accordance with an exemplary embodiment. Hereinafter, a structure of the display panel 400 will be described in detail with reference to the accompanying drawings, focusing on when the display panel 400 is the display panel 400 of the liquid crystal display.

As illustrated in FIG. 7, the display panel 400 according to the exemplary embodiment may include a liquid crystal layer 420, a first polarizing film 410 located on an observer side of the liquid crystal layer 420, and a second polarizing film 430 located on a side opposite to the observer side of the liquid crystal layer 420. Here, the first polarizing film 410 and the second polarizing film 430 may have a structure in which the liquid crystal layer 420 is interposed between them.

The first polarizing film 410 may be a film in which a polarizer is attached to a surface of a thin film transistor (TFT) substrate having a pixel array formed on the TFT substrate. The second polarizing film 430 may be a film in which a polarizer having an optical absorption axis of 90° with respect to the polarizer attached to the first polarizing film 410 is attached to a surface of a color filter substrate implementing colors.

Hereinafter, a process of implementing a 2D and 3D image of the glass-free image display device 10 configured in this way will be described in detail.

Figure 8:
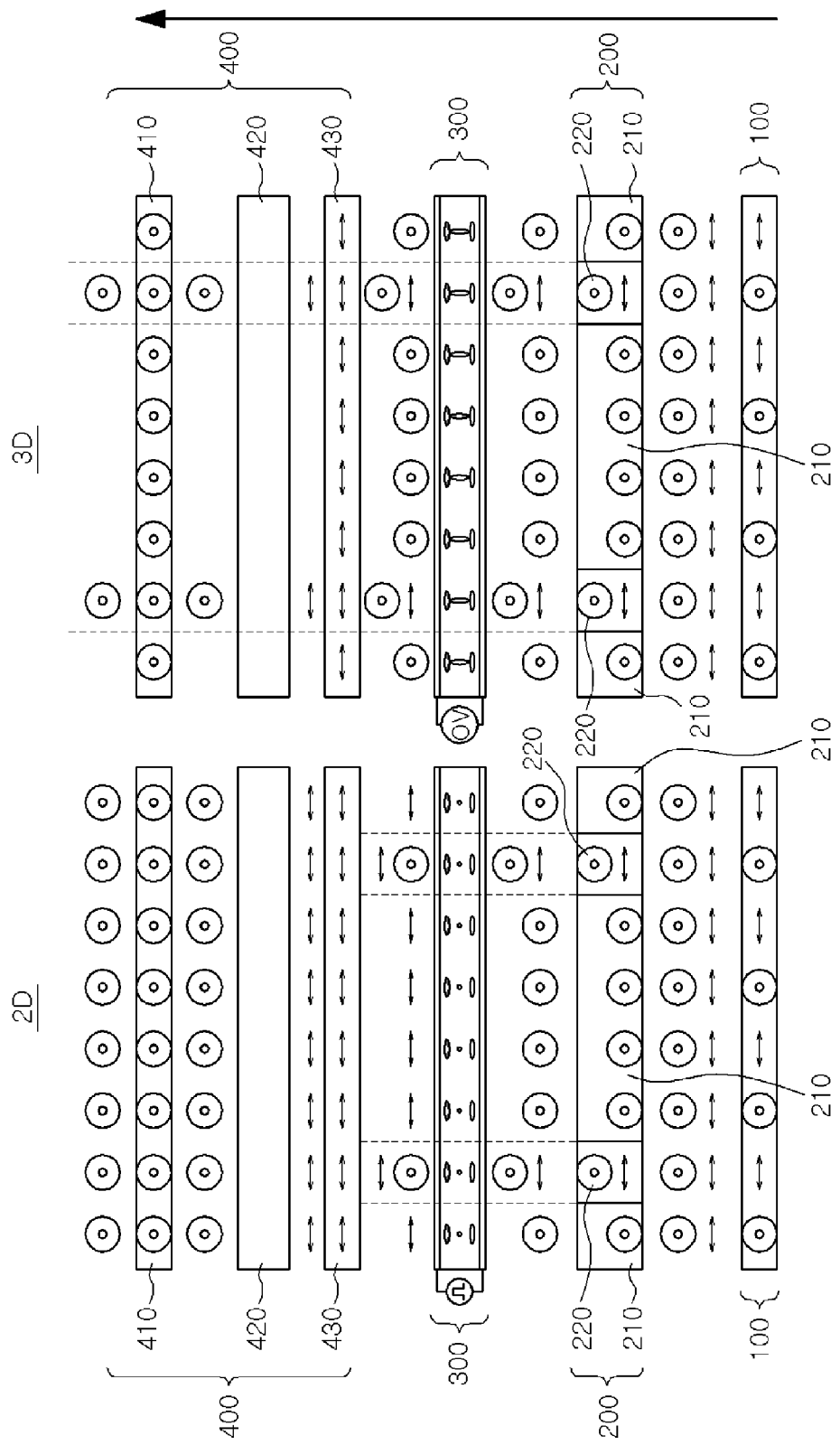
FIG. 8 is a diagram illustrating a process of displaying a two-dimensional (2D) image and a three-dimensional (3D) image through the glass-free image display device according to the exemplary embodiment.

FIG. 8 is a diagram illustrating a process of implementing a 2D image and a 3D image through the glass-free image display device 10 according to the exemplary embodiment. In FIG. 8, among optical components which are output from the light source 100, optical components having polarization axes along the vertical-direction (☉) and horizontal-direction (↔) are exemplified, and an example to which the mask-type polarizer 200 is applied will be described.

In order to output an image in a 2D mode, light output from the light source 100 is incident on the mask-type polarizer 200. Of the light incident on the mask-type polarizer 200, light incident on the first polarizing region 210 passes through the first polarizing region 210 and is linearly polarized, and light incident on the second polarizing region 220 is circularly polarized.

FIG. 8 illustrates an example in which the first polarizing region 210 linearly polarizes only light having a polarization axis along the vertical-direction (⊙). Due to a structure of the first polarizing region 210, of the light incident on the first polarizing region 210, only light having a polarization axis along the vertical-direction (⊙) is linearly polarized and passes through, and the remaining light, including light having a polarization axis along the horizontal-direction (↔), is blocked. As a result, of the light passing through the polarizer 200, light passing through the first polarizing region 210 has a polarization axis along the vertical-direction (⊙) and light passing through the second polarizing region 220 is circularly polarized light.

Light output from the polarizer 200 is incident on the PS panel 300. In the PS panel 300, according to the exemplary embodiment, the electric field is applied when a 2D mode is implemented. Liquid crystals are arranged so that linearly polarized light along the vertical-direction (⊙) of light is rotated by 90° and is converted into linearly polarized light along the horizontal-direction (↔), and linearly polarized light along the horizontal-direction (↔) of light is rotated by 90° and is converted into linearly polarized light along the vertical-direction (⊙).

As a result, in light passing through the PS panel 300 of a part corresponding to the first polarizing region 210 of the polarizer 200, linearly polarized light along the vertical-direction (⊙) of light is rotated by 90° and is output in the form of linearly polarized light having a polarization axis along the horizontal-direction (↔). In addition, in light passing through the PS panel 300 of a part corresponding to the second polarizing region 220 of the polarizer 200, linearly polarized light along the vertical-direction (⊙) of light is rotated by 90° and is output in the form of linearly polarized light along the horizontal-direction (↔), and linearly polarized light along the horizontal-direction (↔) of light is rotated by 90°, and is converted into linearly polarized light along the vertical-direction (⊙) and is output.

Light output from the PS panel 300 is incident on the display panel 400, and more specifically, incident on the second polarizing film 430 of the display panel 400. As illustrated in FIG. 8, the second polarizing film 430 may include a polarizer which allows only light having a polarization axis along the horizontal-direction (↔) to pass through. Therefore, of the light incident on the second polarizing film 430, only light having a polarization axis along the horizontal-direction (↔) passes through the second polarizing film 430.

Light passing through the second polarizing film 430 passes through the liquid crystal layer 420 of the display panel 400. The light propagating path is rotated by the liquid crystal layer 420 of the display panel 400 and is converted into light having a polarization axis along the vertical-direction (⊙).

Light passing through the liquid crystal layer 420 is incident on the first polarizing film 410 of the display panel 400. As illustrated in FIG. 8, the first polarizing film 410 is formed to pass through only light having a polarization axis along the vertical-direction (⊙). Therefore, of the light incident on the first polarizing film 410, only light having a polarization axis along the vertical-direction (⊙) passes through the first polarizing film 410.

As a result, since light having a polarization axis along the vertical-direction (⊙) is output through a front of the display panel 400, a general 2D image may be implemented.

Next, a process of outputting an image in a 3D mode in the glass-free image output device according to the exemplary embodiment will be described.

In order to output an image in a 3D mode, light output from the light source 100 is incident on the mask-type polarizer 200 the same as in the 2D mode. Out of the light incident on the mask-type polarizer 200, light incident on the first polarizing region 210 passes through the first polarizing region 210 and is linearly polarized, and light incident on the second polarizing region 220 is circularly polarized. Since a process and a principle of passing light through the polarizer 200 are the same as in the 2D mode, the repeated description about the polarizer 200 will be omitted.

Light output from the polarizer 200 is incident on the PS panel 300. The PS panel 300 according to the exemplary embodiment is designed so that liquid crystals are arranged to pass through light, which has not changed, when no electric field is applied to the PS panel 300, and thereby a 3D mode is implemented. As a result, light which is output from the polarizer 200 passes through the PS panel 300 without changing.

Light output from the PS panel 300 is incident on the display panel 400, and more specifically, is incident on the second polarizing film 430 of the display panel 400. As described above, since the second polarizing film 430 includes a polarizer which allows only light having a polarization axis along the horizontal-direction (↔) to pass through, out of the light incident on the second polarizing film 430, only light having a polarization axis along the horizontal-direction (↔) passes through the second polarizing film 430. That is, no light passes through a region corresponding to the first polarizing region 210 of the polarizer 200 out of a polarizing region of the second polarizing film 430, and only light having a polarization axis along the horizontal-direction (↔) passes through a region corresponding to the second polarizing region 220 of the polarizer 200 out of the polarizing region of the second polarizing film 430.

Light passing through the second polarizing film 430 passes through the liquid crystal layer 420 of the display panel 400, the light propagating path is rotated by the liquid crystal layer 420 of the display panel 400, and the light is converted into light having a polarization axis along the vertical-direction (⊙).

Light passing through the liquid crystal layer 420 is incident on the first polarizing film 410 of the display panel 400. As illustrated in FIG. 8, since the first polarizing film 410 includes a polarizer which allows only light having a polarization axis along the vertical-direction (⊙) to pass through, of the light incident on the first polarizing film 410, only light having a polarization axis along the vertical-direction (⊙) passes through the first polarizing film 410.

As a result, in the display panel 400, light having a polarization axis along the vertical-direction (⊙) is output from only a region corresponding to the second polarizing region 220 of the polarizer 200. Since light is output from only the region corresponding to the second polarizing region 220 of the polarizer 200, a parallax between a left eye and a right eye is formed and thereby the 3D mode may be implemented.

In summary, by turning the electric field applied to the PS panel 300 on and off, it is possible to easily implement the 2D and 3D mode. As illustrated in FIG. 8, it is possible to design the image display device so that the 2D mode is implemented when the electric field is applied to the PS panel 300 and the 3D mode is implemented when an electric field is not applied to the PS panel 300 or vice versa.

Next, a glass-free image display device 10*a* according to another exemplary embodiment will be described in detail.

Figure 9:
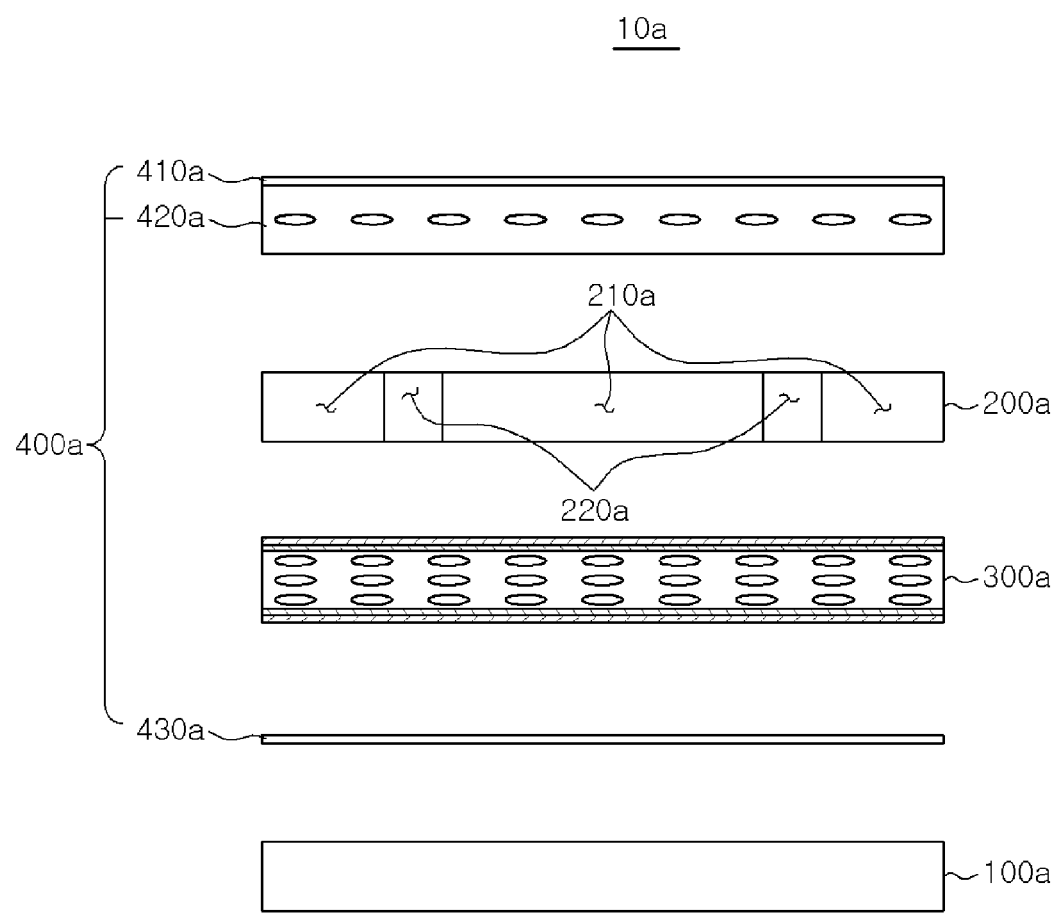
FIG. 9 is a diagram illustrating a schematic configuration of a glass-free image display device according to another exemplary embodiment.

FIG. 9 is a diagram illustrating a schematic configuration of the glass-free image display device 10a according to another exemplary embodiment.

As illustrated in FIG. 9, the glass-free image display device 10a according to another exemplary embodiment includes a light source 100a configured to output light to an upper side, a PS panel 300a disposed above the light source 100a, a polarizer 200a disposed above the PS panel 300a, and a display panel 400a disposed above the polarizer 200a. Here, the PS panel 300a, the polarizer 200a, and the display panel 400a may be sequentially stacked on a light propagating path, and the position and location may be changed as can be easily conceived by those skilled in the art. FIG. 9 exemplifies a case in which a second polarizing film 430a in a configuration of the display panel 400a is disposed between the light source 100a and the PS panel 300a.

Since operating principles and functions of each configuration of the image display device 10a illustrated in FIG. 9 are similar to each configuration illustrated in FIG. 1, repeated descriptions about the PS panel 300a and the polarizer 200a will be omitted.

The display panel 400a is a display device for displaying 2D and 3D image data. FIG. 9 exemplifies a case in which an image is implemented by an LCD device. A configuration of the display panel 400a illustrated in FIG. 9 is the same as in FIG. 1. However, in FIG. 9, a second polarizing film 430a of the display panel 400a may be separated from a liquid crystal layer 420a and located between the light source 100a and the PS panel 300a.

In addition, as shown in FIG. 9, since a polarization direction of light incident on the liquid crystal layer 420a and a polarization direction of light of the first polarizing film 410a are the same, a liquid crystal operation of the 2D liquid crystal layer 420a needs to be conversely applied. This will described in detail below in a process of implementing a 2D image of the image display device 10a.

Figure 10:
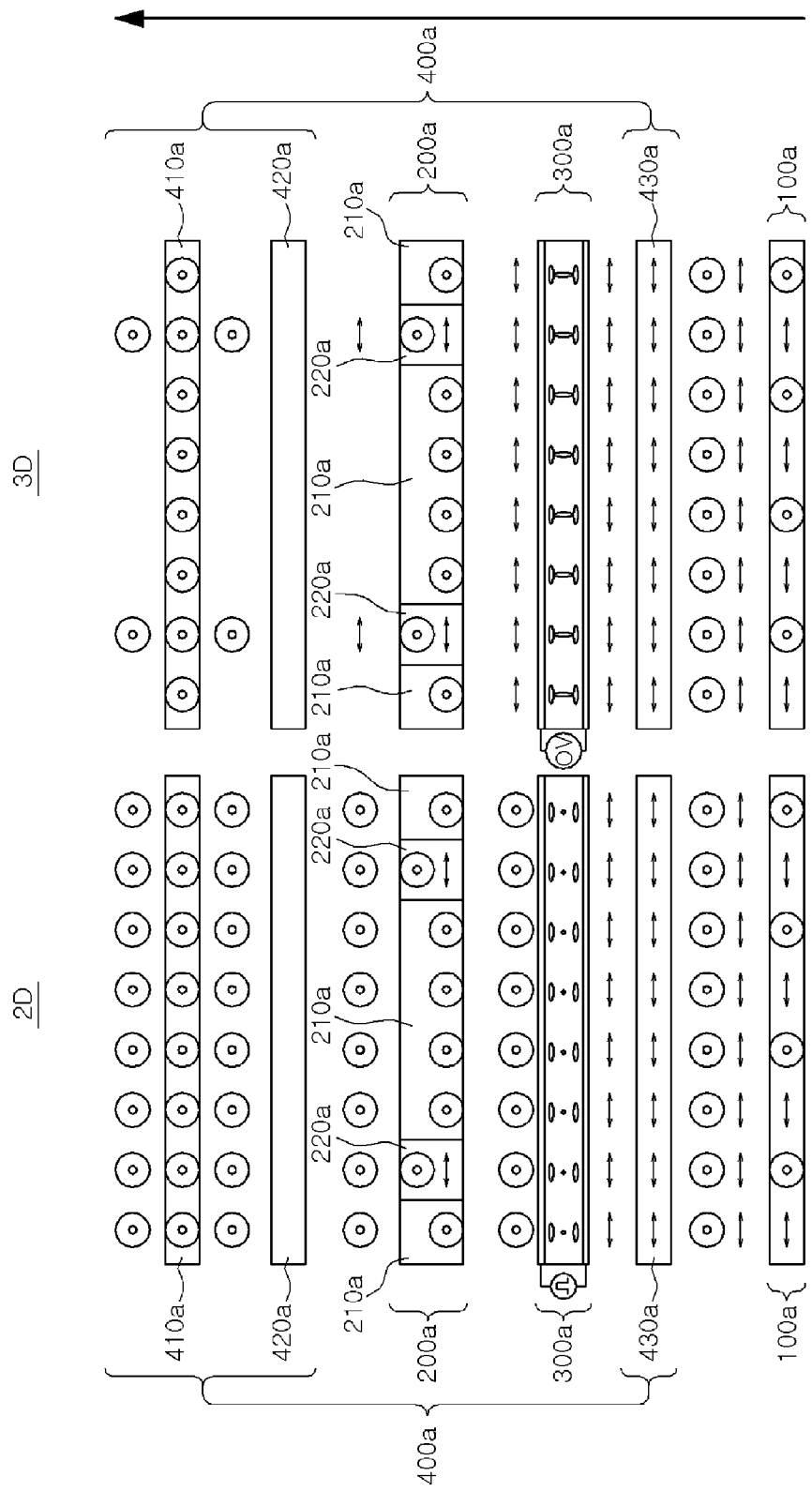
FIG. 10 is a diagram illustrating a process of displaying a 2D image and a 3D image through the glass-free image display device according to another exemplary embodiment.

Next, a process of implementing a 2D and 3D image of the glass-free image display device 10a configured as in FIG. 9 will be described in detail. FIG. 10 is a diagram illustrating a process of implementing a 2D image and a 3D image through the glass-free image display device 10a according to another exemplary embodiment. In FIG. 10, of the optical components output from the light source 100a, optical components having polarization axes along the vertical-direction (☉) and the horizontal-direction (↔) are exemplified and an example in which the mask-type polarizer 200a is applied will be described.

In order to output an image in a 2D mode, light which is output from the light source 100a is incident on the second polarizing film 430a. As illustrated in FIG. 10, since the second polarizing film 430a includes a polarizer which allows only light having a polarization axis along the horizontal-direction (↔) to pass through, of the light incident on the second polarizing film 430a, only light having a polarization axis along the horizontal-direction (↔) passes through the second polarizing film 430a.

Light passing through the second polarizing film 430a is incident on the PS panel 300a. The PS panel 300a according to another exemplary embodiment is designed so that, when the electric field is applied to the PS panel 300a, liquid crystals are arranged so that linearly polarized light along the horizontal-direction (↔) of light is rotated by 90° and is converted into linearly polarized light along the vertical-direction (☉), and thereby a 2D mode is implemented. As a result, an optical component having a polarization axis along the vertical-direction (☉) is output from the PS panel 300a.

Light output from the PS panel 300a is incident on the mask-type polarizer 200a. Of the light incident on the mask-type polarizer 200a, light incident on a first polarizing region 210a passes through the first polarizing region 210a and is linearly polarized, and light incident on a second polarizing region 220a is circularly polarized.

More specifically, FIG. 10 illustrates an example in which the first polarizing region 210a linearly polarizes only light having a polarization axis along the vertical-direction (☉). Of the light incident on the first polarizing region 210a, only light having a polarization axis along the vertical-direction (☉) is linearly polarized and passes through, and the remaining light including light having a polarization axis along the horizontal-direction (↔) is blocked. However, in the 2D mode illustrated in FIG. 10, since the light incident on the first polarizing region 210a has already passed through the first polarizing film 410a and the PS panel 300a and has a polarization axis along the vertical-direction (☉), the incident light maintains the polarization axis along the vertical-direction (☉) and passes through without change. Since the second polarizing region 220a allows light having a polarization axis along the vertical-direction (☉) or light having a polarization axis along the horizontal-direction (↔) to pass through, the light that is incident on the second polarizing region 220a and has a polarization axis along the vertical-direction (☉) maintains the polarization axis along the vertical-direction (☉) and passes through without change. As a result, in the mask-type polarizer 200a, light having a polarization axis along the vertical-direction (☉) is output from an entire region of the polarizer 200a.

Light output from the polarizer 200a is incident on the liquid crystal layer 420a. As illustrated in FIG. 10, since a polarization direction of the first polarizing film 410a and a polarization direction of the light incident on the liquid crystal layer 420a are the same, it is necessary to implement a liquid crystal operation of the liquid crystal layer 420a conversely as in FIG. 8 in order to implement a 2D mode.

Figure 11A:
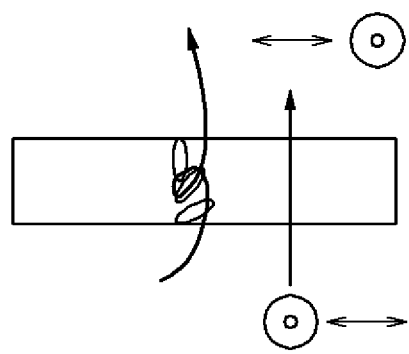
FIGS. 11A and 11B are diagrams illustrating a liquid crystal operating principle of a liquid crystal layer, in accordance with an exemplary embodiment.
Figure 11B:
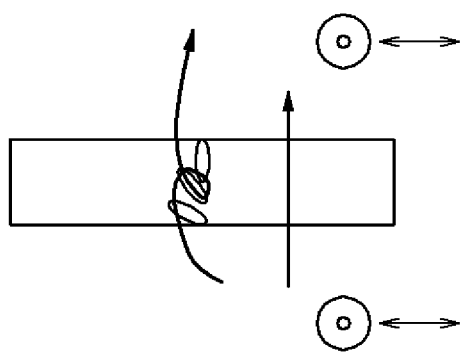

More specifically, the liquid crystal operation of the liquid crystal layer 420a will be described with reference to FIGS. 11A and 11B. FIGS. 11A and 11B are diagrams illustrating a liquid crystal operating principle of a liquid crystal layer in accordance with an exemplary embodiment. In FIG. 8, liquid crystal particles are operated as in FIG. 11A. A polarization axis of an optical component passing through the liquid crystal layer 420a is rotated by 90°, and thereby the 2D mode is implemented. In FIG. 10, liquid crystal particles are conversely operated as in FIG. 11B. A polarization axis of an optical component passing through the liquid crystal layer 420a does not rotate, and thereby the 2D mode is implemented.

As a result, light having a polarization axis along the vertical-direction (☉) is output from the liquid crystal layer 420a. This light passes through the first polarizing film 410a which polarizes light in the vertical-direction (☉), and thereby an image in a 2D mode is implemented.

Next, a process of outputting an image in a 3D mode in a glass-free image output device according to another embodiment will be described, as shown in FIG. 10.

In order to output an image in a 3D mode, light output from the light source 100a is incident on the second polarizing film 430a the same way as in the 2D mode. As illustrated in FIG. 10, since the second polarizing film 430a includes a polarizer which allows only light having a polarization axis along the horizontal-direction (↔) to pass through, of the light incident on the second polarizing film 430a, only light having a polarization axis along the horizontal-direction (↔) passes through the second polarizing film 430a. Since this is the same as in the process of outputting an image in a 2D mode, a repeated description will be omitted.

Light passing through the second polarizing film 430a is incident on the PS panel 300a. The PS panel 300a according to the exemplary embodiment is designed so that liquid crystals are arranged to pass through light without change when no electric field is applied to the PS panel 300a, and thereby the 3D mode is implemented. As a result, light having a polarization axis along the horizontal-direction (↔) output from the second polarizing film 430a passes through the PS panel 300a without change.

Light output from the PS panel 300a is incident on the mask-type polarizer 200a. Of the light incident on the mask-type polarizer 200a, light incident on the first polarizing region 210a passes through the first polarizing region 210a and is linearly polarized, and light incident on the second polarizing region 220a is circularly polarized.

More specifically, since FIG. 10 illustrates an example in which the first polarizing region 210a linearly polarizes only light having a polarization axis along the vertical-direction (⊙), of the light incident on the first polarizing region 210a, only light having a polarization axis along the vertical-direction (⊙) is linearly polarized and passes through, and the remaining light including light having a polarization axis along the horizontal-direction (↔) is blocked. As a result, in the 3D mode illustrated in FIG. 10, since light incident on the first polarizing region 210a passes through the first polarizing film 410a and the PS panel 300a and has a polarization axis along the horizontal-direction (↔), the incident light does not pass through the first polarizing region 210a and is blocked. On the other hand, since the second polarizing region 220a allows light having a polarization axis along the vertical-direction (⊙) or light having a polarization axis along the horizontal-direction (↔) to pass through, light that is incident on the second polarizing region 220a and has a polarization axis along the horizontal-direction (↔) maintains the polarization axis along the horizontal-direction (↔) and passes through without change. As a result, in the mask-type polarizer 200a, light having a polarization axis along the horizontal-direction (↔) is output from the second polarizing region 220a.

Light output from the polarizer 200a is incident on the liquid crystal layer 420a. As illustrated in FIG. 10, since a polarization direction of the first polarizing film 410a and a polarization direction of the light incident on the liquid crystal layer 420a form an angle of 90°, it is beneficial that the liquid crystal operation of the liquid crystal layer 420a is implemented the same as in FIG. 8 in order to implement the 3D mode. As a result, a light propagating path of the light incident on the liquid crystal layer 420a is rotated by the liquid crystal layer 420a, and the light is converted into light having a polarization axis along the vertical-direction (⊙).

Light which passes through the liquid crystal layer 420a is incident on the first polarizing film 410a of the display panel 400a. As illustrated in FIG. 10, since the first polarizing film 410a includes a polarizer which allows only light having a polarization axis along the vertical-direction (⊙) to pass through, out of the light incident on the first polarizing film 410a, only light having a polarization axis along the vertical-direction (⊙) passes through the first polarizing film 410a.

As a result, in the display panel 400a, light having a polarization axis along the vertical-direction (⊙) is output from only a region corresponding to the second polarizing region 220a of the polarizer 200a. Since light is output from only the region corresponding to the second polarizing region 220a' of the polarizer 200a, a parallax between the left eye and the right eye is formed and thereby the 3D mode may be implemented.

The image display device configured as described above and in accordance with the exemplary embodiments has the following effects.

First, a mask-type polarizer instead of an anisotropic lens is used, and thereby it is advantageous in terms of costs.

Also, the reflectivity of a surface of the mask-type polarizer improves, and thereby the luminance of the image display device increases.

Those skilled in the art may variously modify and change the above described exemplary embodiments without departing from the scope and spirit of the exemplary embodiments. Therefore, the technological scope of the exemplary embodiments is not limited to detailed description herein but may be understood as concepts including the invention that can be easily conceived by those skilled in the art through the detailed description of the specification.

Although a few exemplary embodiments have been shown and described, it would be appreciated by those skilled in the art that changes may be made in these exemplary embodiments without departing from the principles and spirit of the exemplary embodiments, the scope of which is defined in the claims and their equivalents.

What is claimed is:

1. An image display device, comprising:
 a light source;
 a polarizer comprising a first polarizing region configured to pass linearly polarized light having a first polarization direction among light output from the light source and a second polarizing region configured to pass circularly polarized light among the light output from the light source; and
 a polarization switch (PS) panel configured to:
  switch between a first mode and a second mode,
  in the first mode, pass the linearly polarized light after changing a polarization direction of the linearly polarized light to a second polarization direction that is orthogonal to the first polarization direction, and pass linearly polarized light having the first and second polarization directions among the circularly polarized light, and
  in the second mode, pass the linearly polarized light and the circularly polarized light output from the polarizer without changing the polarization direction of the linearly polarized light; and
 a display panel comprising:
  a first polarizing film configured to pass linearly polarized light having the second polarization direction among light output from the PS panel;
  a twisted nematic liquid crystal layer configured to, when there is no voltage applied, orthogonally change a polarization direction of the linearly polarized light that passes the first polarizing film; and
  a second polarizing film configured to pass linearly polarized light having the first polarization direction, among light that passes the twisted nematic liquid crystal layer.

2. The device according to claim 1, wherein, in the polarizer, the first polarizing region and the second polarizing region are formed on the polarizer so as to alternate.

3. The device according to claim 1, wherein the first polarizing region and the second polarizing region of the polarizer have a same transmittance.

4. The device according to claim 1, wherein the first polarizing region is a larger region than the second polarizing region.

5. The device according to claim 1, wherein a reflectivity of a first surface of the polarizer facing the light source is higher than a reflectivity of a second surface of the polarizer which does not face the light source.

6. The device according to claim 1, wherein the PS panel is a liquid crystal panel configured to switch between the first mode and the second mode using a dielectric anisotropy of a liquid crystal operating in a twisted nematic (TN) mode.

7. The device according to claim 1, wherein the PS panel is further configured to operate in the first mode when a predetermined electric field is applied to the PS panel, and operate in the second mode when no electric field is applied to the PS panel.

8. The device according to claim 1, the display panel is further configured to output an image.

9. The device according to claim 8, wherein the display panel is located after the polarizer with respect to an output direction of the light output from the light source.

10. An image display device, comprising:
a polarizing film configured to pass linearly polarized light having a first polarization direction among light output from a light source;
a polarization switch (PS) panel configured to:
switch between a first mode and a second mode,
in the first mode, pass the linearly polarized light output from the polarizing film after changing a polarization direction to a second polarization direction that is orthogonal to the first polarization direction, and
in the second mode, pass the linearly polarized light output from the polarizing film without changing the polarization direction;
a polarizer comprising a first polarizing region configured to pass linearly polarized light having the second polarization direction among light output from the PS panel, and a second polarizing region configured to pass linearly polarized light having the first and second polarization directions among the light output from the PS panel; and
a twisted nematic liquid crystal layer configured to, when a non-zero voltage is applied, pass linearly polarized light output from the polarizer without changing a polarization direction of the linearly polarized light output from the polarizer when the PS panel is operating in the first mode, and, when no voltage is applied, orthogonally change the polarization direction of the linearly polarized light output from the polarizer when the PS panel is operating in the second mode.

11. The device according to claim 10, wherein the PS panel is a liquid crystal panel configured to switch between the first mode and the second mode using a dielectric anisotropy of a liquid crystal operating in a twisted nematic (TN) mode.

12. The device according to claim 10, wherein the PS panel is further configured to operate in the first mode when a predetermined electric field is applied to the PS panel, and operate in the second mode when no electric field is applied to the PS panel.

* * * * *